United States Patent
Brugnoni et al.

(10) Patent No.: US 11,453,271 B2
(45) Date of Patent: Sep. 27, 2022

(54) ADSORPTION REFRIGERATION SYSTEM FOR THE PRODUCTION OF DEMINERALIZED WATER ABOARD A MOTOR VEHICLE, MOTOR VEHICLE AND METHOD FOR PRODUCING DEMINERALIZED WATER ABOARD A MOTOR VEHICLE

(71) Applicant: MARELLI EUROPE S.P.A., Corbetta (IT)

(72) Inventors: Enrico Brugnoni, Corbetta (IT); Matteo De Cesare, Milan (IT)

(73) Assignee: MARELLI EUROPE S.P.A., Corbetta (IT)

( * ) Notice: Subject to any disclaimer, the term of this patent is extended or adjusted under 35 U.S.C. 154(b) by 410 days.

(21) Appl. No.: 16/819,056

(22) Filed: Mar. 14, 2020

(65) Prior Publication Data
US 2020/0290433 A1    Sep. 17, 2020

(30) Foreign Application Priority Data
Mar. 15, 2019   (IT) .......................... 102019000003829

(51) Int. Cl.
*B01D 53/04* (2006.01)
*B01D 53/26* (2006.01)
(Continued)

(52) U.S. Cl.
CPC .......... *B60H 3/024* (2013.01); *B01D 53/0438* (2013.01); *B01D 53/0446* (2013.01);
(Continued)

(58) Field of Classification Search
CPC ................ B01D 53/04; B01D 53/0407; B01D 53/0438; B01D 53/0446; B01D 53/0454;
(Continued)

(56) References Cited

U.S. PATENT DOCUMENTS

| | | | |
|---|---|---|---|
| 3,891,410 A * | 6/1975 | Hankison | B01D 53/26 95/14 |
| 4,313,312 A | 2/1982 | Ito et al. | |

(Continued)

FOREIGN PATENT DOCUMENTS

JP     H04292752 A     10/1992

OTHER PUBLICATIONS

Search Report for Italian Patent Application No. IT 201900003829 dated Dec. 5, 2019.

*Primary Examiner* — Frank M Lawrence, Jr.
(74) *Attorney, Agent, or Firm* — Howard & Howard Attorneys PLLC

(57) ABSTRACT

An adsorption system for the production of demineralized water aboard a motor vehicle comprising: a condenser, an evaporator, a first and a second adsorbent bed, each containing adsorbent material. Each adsorbent bed is selectively connectable to the condenser and/or the evaporator by pipes provided with at least one control valve. Each adsorbent bed is selectively and alternately connectable to a supply circuit of a heating source and to a supply circuit of a cooling source via supply valves. The condenser is directly and selectively connectable to the evaporator by a direct branch provided with a relative throttle valve, An inlet valve is arranged along an air inlet branch, and selectively establishes a fluid connection between the air of the environment outside the system and the adsorbent beds, so as to capture water from the external air through an adsorption phenomenon performed by the adsorbent beds and to produce water.

25 Claims, 5 Drawing Sheets

(51) Int. Cl.
*F24F 3/14* (2006.01)
*B60H 3/02* (2006.01)
*B60H 1/00* (2006.01)
*B60H 1/32* (2006.01)
*F23L 7/00* (2006.01)

(52) U.S. Cl.
CPC ............ B01D 53/261 (2013.01); B60H 1/00 (2013.01); B60H 1/3205 (2013.01); F23L 7/002 (2013.01); *B01D 2253/106* (2013.01); *B01D 2253/108* (2013.01); *B01D 2257/80* (2013.01); *B01D 2259/4566* (2013.01)

(58) Field of Classification Search
CPC ............ B01D 53/261; B01D 2253/106; B01D 2253/108; B01D 2257/80; B01D 2258/06; B01D 2259/40003; B01D 2259/4566; B60H 1/00; B60H 1/3205; F23L 7/002; F24F 3/1411
USPC ..... 96/121, 143, 146; 95/115, 117, 123, 126
See application file for complete search history.

(56) References Cited

U.S. PATENT DOCUMENTS

| | | | | |
|---|---|---|---|---|
| 5,069,038 A | * | 12/1991 | Peinze | B01D 5/0039 |
| | | | | 62/636 |
| 2009/0095162 A1 | * | 4/2009 | Hargis | B01D 53/263 |
| | | | | 96/245 |
| 2014/0338883 A1 | * | 11/2014 | Watanabe | B01D 53/265 |
| | | | | 165/59 |

* cited by examiner

ADSORPTION REFRIGERATION SYSTEM FOR THE PRODUCTION OF DEMINERALIZED WATER ABOARD A MOTOR VEHICLE, MOTOR VEHICLE AND METHOD FOR PRODUCING DEMINERALIZED WATER ABOARD A MOTOR VEHICLE

CROSS-REFERENCE TO RELATED APPLICATIONS

The present application claims priority to and all the benefits of Italian Patent Application No. 102019000003829 filed on Mar. 15, 2019, which is hereby expressly incorporated herein by reference in its entirety.

BACKGROUND OF THE INVENTION

1. Field of the Invention

The present invention relates to an adsorption refrigeration system for the production of demineralized water aboard a motor vehicle, a motor vehicle comprising said system and method for producing demineralized water aboard a motor vehicle thereof.

2. Description of the Related Art

The introduction of water injection systems adapted to increase performance and reduce fuel consumption and emissions in modern internal combustion engines has given rise to the need to fill a tank of demineralized water with a given frequency.

The water injection technology can be interesting for all applications provided with an internal combustion engine. Typically, in Otto cycle engines, the water is injected either directly or indirectly (through the intake pipe) into the combustion chamber to mitigate the knock tendency and to contain the temperature of the exhaust gases. In Diesel cycle engines, the water could be injected into the combustion chamber in the same manner but in this case with the aim of reducing the formation of nitrogen oxides. Furthermore, in this particular type of engine, it could be necessary to inject demineralized water into the exhaust gas treatment system in the presence of a variable concentration SCR system.

All these applications thus require a given volume of demineralized water aboard the vehicle, typically contained in a special tank which, like the fuel tank, must be topped up each time.

However, the need to supply demineralized water makes this technology unattractive to date because users are often unwilling to take on the task of filling up the demineralized water in addition to the fuel.

Obviously, the availability of a demineralized water production system aboard the vehicle would allow to reduce or, at best, eliminate filling up by the end-user, thus making water injection technologies much more attractive.

Such a system or plant should, of course, be energy-efficient so as not to have a significant impact on energy consumption and not to significantly burden the overall cost of the vehicle.

SUMMARY OF THE INVENTION

The need is therefore felt in the art to make available a system for the production of demineralized water aboard a motor vehicle and the production method demineralized water aboard a motor vehicle thereof, in order to achieve the aforesaid technical effects.

Such a need is met by a system for the production of demineralized water aboard a motor vehicle and by a production method of demineralized water aboard a motor vehicle thereof.

Other embodiments of the present invention are described in the detailed description of the invention.

BRIEF DESCRIPTION OF THE DRAWINGS

Further features and advantages of the present invention will be more comprehensible from the following description of preferred embodiments given by way of non-limiting examples, in which.

Elements or parts in common to the embodiments described below will be indicated using the same reference numerals.

DETAILED DESCRIPTION OF THE INVENTION

Figure 1:
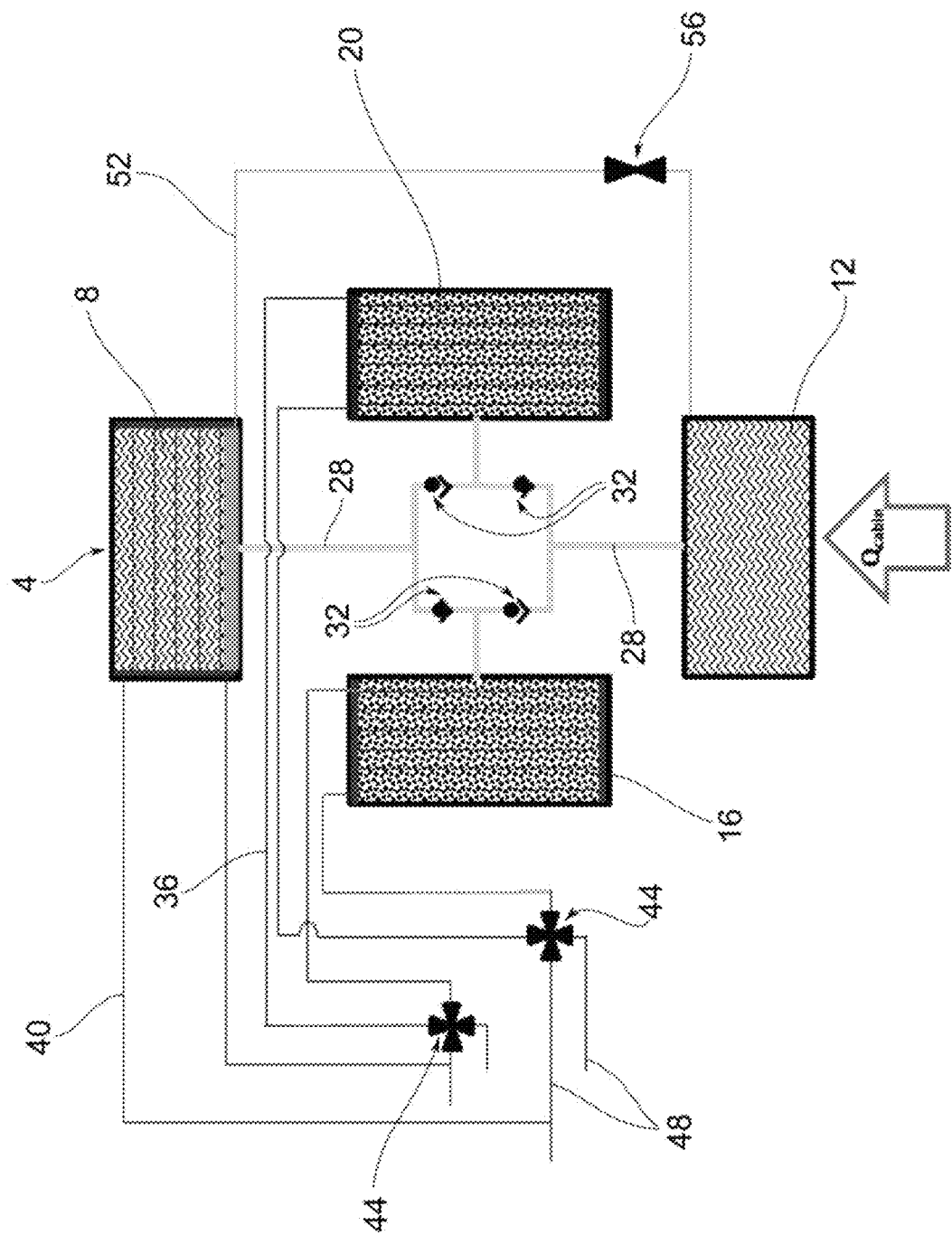
FIG. 1 is a diagrammatic view of a generic adsorption refrigeration system.
Figure 2:
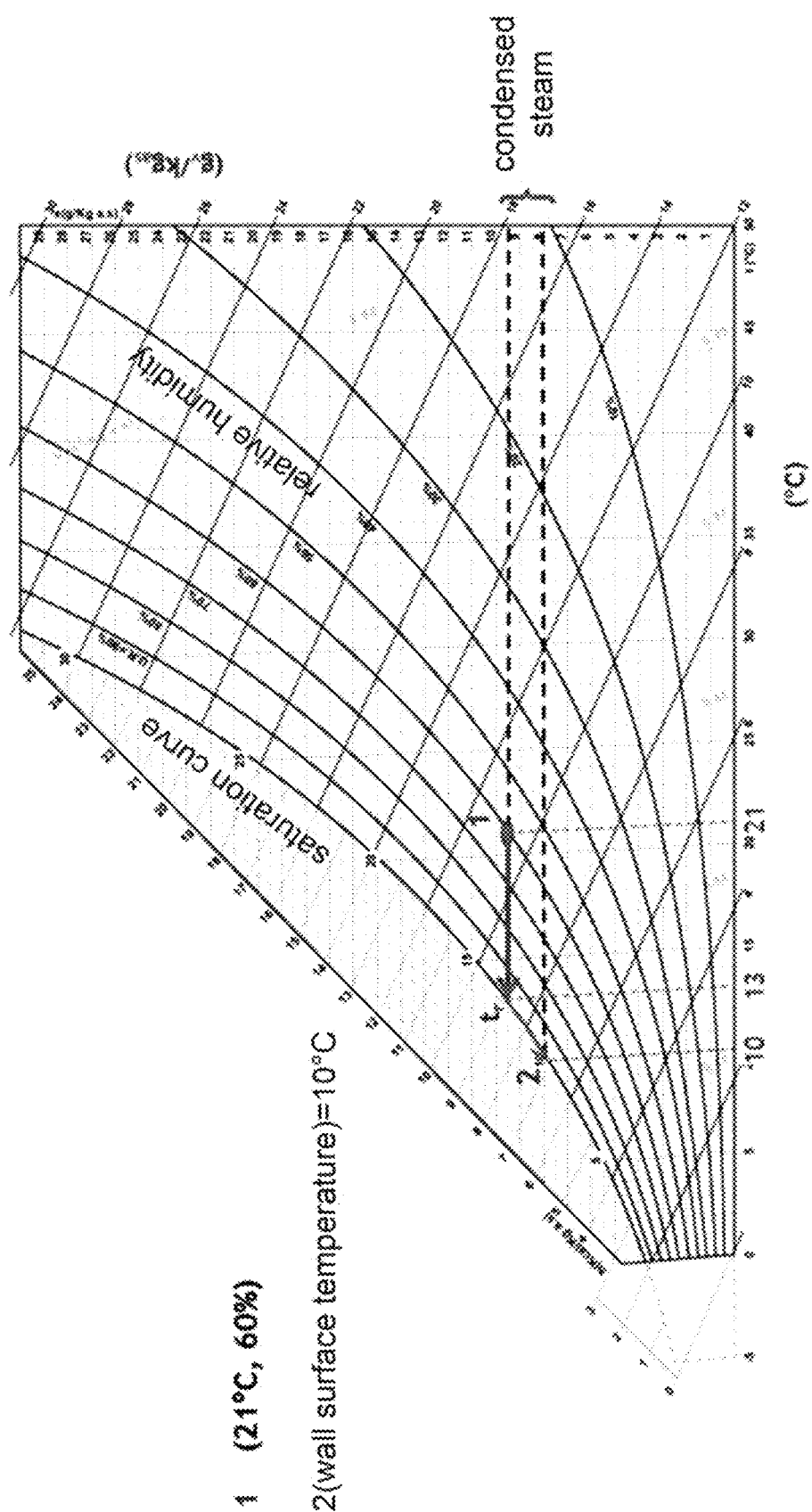
FIG. 2 is a diagram which illustrates the production of water by condensation following the cooling of an air and water mixture at constant pressure.
Figure 3:
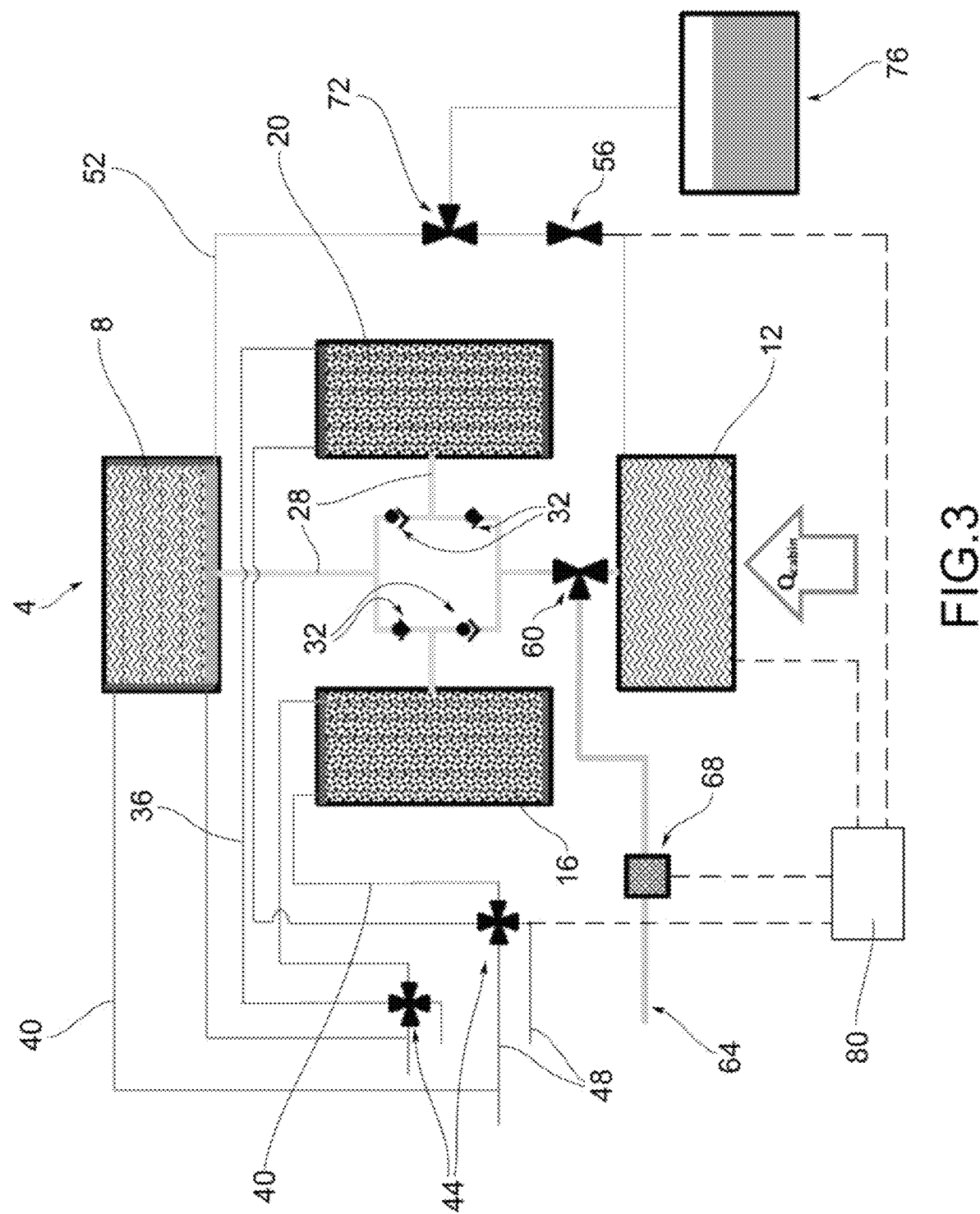
FIG. 3 is a diagrammatic view of an adsorption cooling system according to an embodiment of the present invention.

With reference to the aforesaid figures, reference numeral 4 indicates an adsorption refrigeration system aboard a motor vehicle as a whole.

It is worth noting that the term vehicle is to be understood in a broad sense; in other words, the present invention is easily applied in any type of vehicle.

The system 4 comprises a condenser 8, adapted to condense a flow of gas or water vapour, an evaporator 12, adapted to generate a gas or water vapour flow, a first adsorbent bed 16 and a second adsorbent bed 20, each containing adsorbent material.

The type and dimensions of the condenser 8, of the evaporator 12 and of the adsorbent beds 16, 20 can be varied, without being restrictive for the purposes of the present invention. The adsorbent beds preferably comprise silica-gel and/or zeolites as adsorbent material.

Each adsorbent bed 16, 20 is selectively connectable to the condenser 8 and/or the evaporator 12 by pipes or conduits 28 provided with at least one control valve 32. The control valves 32 can be of various types, both active and passive.

In particular, according to a possible embodiment, said control valves 32 are one-way valves automatically actuated by the pressure and/or depression created by the flows of gas or water vapour from the adsorbent beds in the pipes 28 in which said control valves 32 are inserted. This type of passive valve has the advantage of self-adjusting, without requiring a specific drive and/or actuator.

According to a further possible embodiment, the control valves 32 are valves selectively operated to ensure the passage/inhibition of respective flows of water vapour or gas in the respective pipes. This embodiment thus provides the use of valves of the active type, so as to have the possibility to guarantee always the correct operation of the valves and possibly to force it, in case of specific system operation requests.

It is worth noting that the types of control valves 32 described above are not mutually alternative or excluding; in other words, a mixed use of said types of control valves 32 is possible within the same system 4.

The specific operation of the control valves is described in greater detail below.

According to the present invention, each adsorbent bed 16, 20 is selectively and alternately connectable to a supply circuit of a heating source 36 and to a supply circuit of a cooling source 40 via respective supply valves 44. The heating source and the cooling source are typically fluids, i.e. water or coolant, from the engine of the vehicle on which the system 4 is installed. It is also possible to use the heating or cooling fluids in the gaseous state, e.g. the engine exhaust gases for heating and the outside ambient air for cooling. The supply circuits of the heating source 36 and of the cooling source 40 typically comprise pipes 48 through which such heating or cooling fluids flow in the liquid or gaseous state.

The condenser 8 is directly and selectively connectable to the evaporator 12 by a direct branch 52 provided with a respective throttle valve 56. The purpose of said throttle valve 56 is to laminate and thus reduce the pressure of the fluid coming from condenser 8 and directed towards evaporator 12, in order to favour its subsequent complete evaporation inside said evaporator 12.

Advantageously, said system 4 comprises an inlet valve 60 arranged along an air inlet branch 64, adapted to selectively making a fluid connection between the air of the environment outside the system 4 and said adsorbent beds 16, 20, so as to capture water from the outside air through an adsorption phenomenon performed by said adsorbent beds 16, 20 and to produce water via the adsorption phenomenon.

According to an embodiment, said inlet valve 60 is a three-way valve able to selectively allow the passage of gas or water vapour from the evaporator 12 towards the adsorbent beds 16, 20 and the passage of external air towards the adsorbent beds 16, 20.

Preferably, said air inlet branch 64 is provided with a filter 68.

According to an embodiment, said system 4 comprises a bleed valve 72, arranged downstream of the condenser 8 so as to allow condensed water to be bled from said condenser 8.

For example, said bleed valve 72 is arranged along said direct branch 52, adapted to allow the bleeding of condensed water coming from condenser 8 to evaporator 12.

For example, said bleed valve 72 is a three-way valve, which selectively allows the direct passage of liquid along the direct branch 52 and the drainage of liquid outside the system 4.

According to an embodiment, the bleed valve 72 is connected to a water collection tank 76.

The operation of an adsorption system for the production of demineralized water aboard a vehicle in accordance with this invention will now be described.

First of all, as seen, the present invention consists of an air-cooling system based on an adsorption cycle, appropriately modified so that:

in the presence of "high" outside temperature, cooled air is generated to air-condition the passenger compartment and demineralized water condensed is generated from outside humidity, exploiting the waste heat of the engine, instead of taking mechanical or electrical power as in a normal system based on a compression cycle. It is worth noting that high outside temperature means a temperature normally above the range of 7° C.-17° C., typically 15° C.

In presence of low outside temperatures, i.e. when the vehicle users do not require cool air and when it would in any case not be possible to condense the humidity contained in the external air due to the limited amount of water in the air (absolute humidity) and the impossibility to lower the evaporator operating temperature below a given value (typically 5-7° C.), the "open cycle" adsorption system is used to capture the water contained in the air through the adsorption process via the adsorbing beds 16, 20.

The operation process remains practically the same as a normal refrigeration operation. In particular:

one of the two beds, e.g. the first adsorbing bed 16, is cooled and then the adsorption of water from the air is activated, causing a pressure drop which leads to the closing of control valve 32 towards the condenser 8 and the opening of control valve 32 towards inlet valve 60, which, if correctly operated, allows the external air to be introduced through the air inlet branch 64.

The first adsorbent bed 16 continues to adsorb water from the external air until it reaches saturation.

The first adsorbing bed 16 is thus heated, thereby activating the water desorption and the consequent pressure increase which leads to the closing of the control valve 32, which connects it to the outside environment through the inlet valve 60 and the air inlet branch 64, and to the opening of the control valve 32 which supplies the condenser 8.

The vapour produced by heating the first adsorbent bed 16 is then condensed and sent to the water collection tank 76 through the opening of the bleed valve 72.

It can be noted that by using two adsorbent beds 16, 20 it is possible to guarantee a given continuity of water flow production, although the basic mechanism is discontinuous.

More specifically, one of the two adsorbent beds, e.g. the second adsorbent bed 16 is heated with a heat source above 80° C. In the case of application on a motor vehicle, such a heat source may be easily available and is, for example, the engine cooling water and/or heat recovered from exhaust gases. It is worth noting that in this manner heat, and therefore thermal energy, which would otherwise be wasted, is recovered: this improves the overall thermal efficiency of the system and the engine of the vehicle on which it is installed.

During heating, the water previously adsorbed by the adsorbing bed is released in form of water vapour and its pressure is increased by closing the control valve 32 connecting to the evaporator 12 and opening the control valve 32 connecting to the condenser 8, which is then supplied by a high-pressure steam flow. Cooling of the vapour occurs in the condenser 8, with the cooling supply circuit 40 at low temperature (preferably below 50° C.), consisting of external air or low temperature cooling liquids, which leads to steam condensation.

The condensed water then reaches the evaporator 12 through the throttle valve 56 which lowers the pressure. In the evaporator 12, if the throttle valve 56 lowers the pressure of the liquid water below a given value, the liquid water goes to the vapour state by removing a quantity of heat equal to its latent vaporizing heat from the outside environment.

In the meantime, the first adsorbent bed 16 is cooled by the cooling supply circuit 40 at low temperature (preferably lower than 50° C.), in order to activate the adsorption of the water and therefore the decrease of the pressure which leads to the closing of the control valve 32 towards the condenser 8 and the opening of the one connected to the evaporator 12.

In this manner, the steam generated in the evaporator 12 is adsorbed in the first adsorbent bed 16. Once the first adsorbent bed 16 is completely desorbed, and thus the second adsorbent bed 20 is saturated with water, by the supply valves 44, the operation of the two adsorbent beds 16, 20 is reversed, thus heating the one which was previously cooled and vice versa cooling the one which was previously heated. In this manner, it is possible to guarantee a practically continuous refrigerating capacity.

It is worth noting that the function of the adsorbing beds 16, 20 is continuously exchanged, passing from heating to cooling, from adsorption to desorption. Therefore, the distinction between first and second adsorbent bed indicated in the description and in the figures is only indicative and must not be considered in a restrictive sense.

After explaining the operation of the system valves and adsorbent beds, it is useful to describe the control/operation logic of the system itself. In particular, such an operating logic is implemented by at least one processing control unit 80, programmed to perform all the controls described below.

Given the virtually zero impact on the performance of the internal combustion engine and the need to ensure consistent availability of water to support potential high load operation of the engine itself, it is convenient to keep the water production system active at all times if the water storage tank 76 is not full.

The choice of one production mechanism rather than another, i.e. production by condensation according to a refrigeration cycle at the evaporator and production by adsorption/desorption, is dictated mainly by two factors:
the possible request for cooling by passengers aboard the vehicle,
the external air temperature.

Indeed, if passengers require cooling of the passenger compartment, regardless of the efficiency in terms of water production, the operation of the refrigerating machine will be forced and then water will be produced by condensation in the evaporator 12.

Conversely, if the passengers do not require the passenger compartment to be cooled, one of the two modes of liquid water production will be chosen, i.e. the one that guarantees a higher flow rate.

For both modes, the water production efficiency depends mainly on environmental conditions (in particular pressure, temperature and relative humidity) and the type of machine (the type of adsorbing material, the temperature of heating and cooling fluids of the adsorbing beds, etc.).

No additional sensors are required to determine the ambient conditions because the barometric pressure sensor, temperature sensor and humidity sensor are already present in practically all vehicles. Furthermore, the temperature and humidity sensors are also normally fitted inside the passenger compartment on vehicles equipped with automatic air conditioning system, so that the amount of water in the recirculated air can also be taken into account. These sensors allow to optimize the control of the system and to diagnose any faults or malfunctions.

Figure 4:
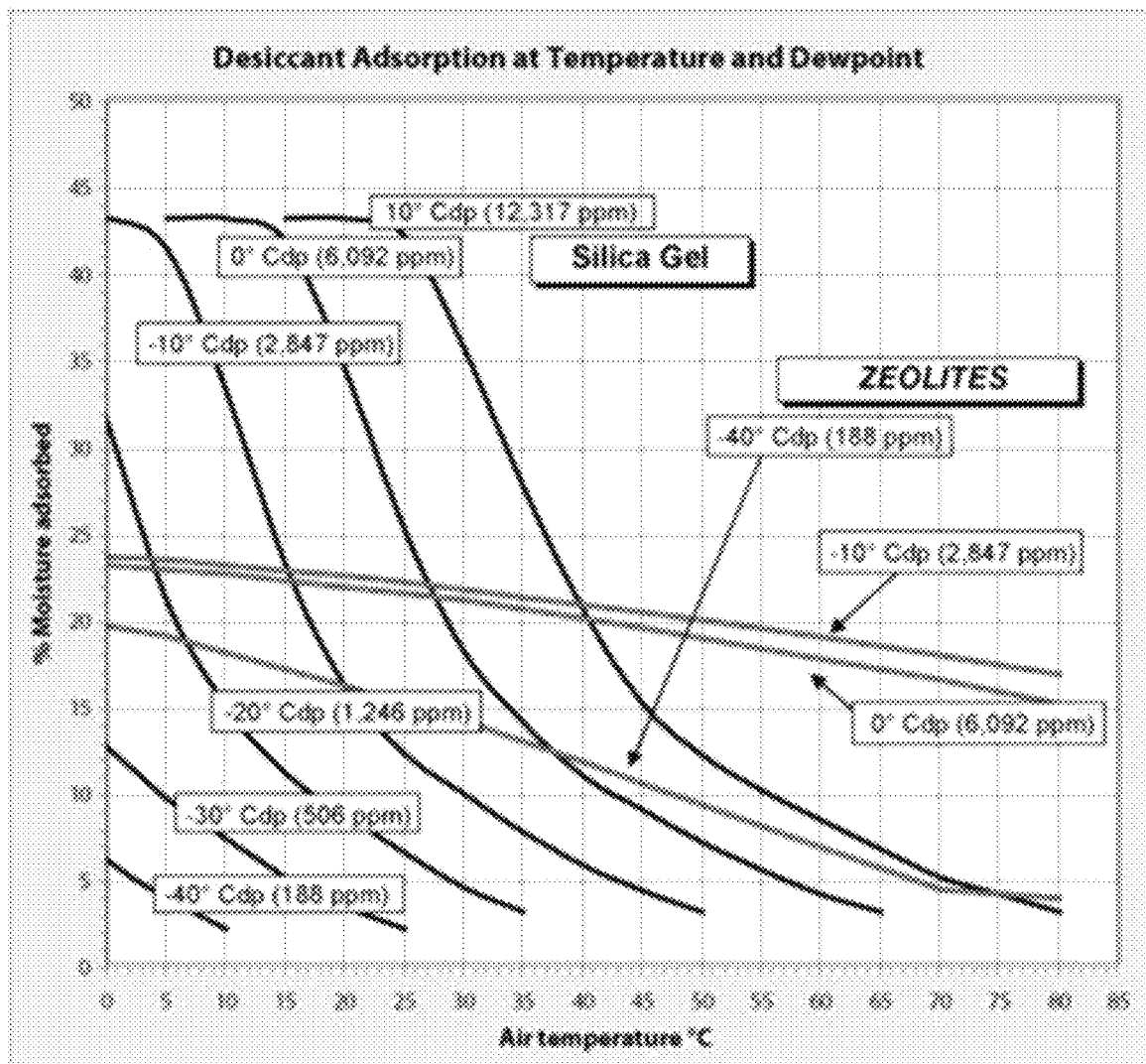
FIG. 4 is a diagram of the adsorbing capacity of different adsorbent materials as a function of air temperature.

In particular, it is possible to switch from one operating mode to another according to the outside temperature. If this is above a given threshold (typically between 7 and 17° C., e.g. 15° C.), the system is operated as a refrigeration machine and the condensed water is collected near the evaporator 12, if necessary after heating the air in the passenger compartment to ensure passenger comfort. This is because, on one hand, the adsorbing capacity of the solid matrix decreases with increasing temperature (see FIG. 4), on the other hand, the higher thermal gradient between the air and the surface of the evaporator 12 leads to a higher capacity to make water condense from the air. The flow rate of water produced will depend on the pressure, temperature and relative humidity of the outside, recirculated air mix.

If, on the other hand, the outside temperature is lower than such a threshold or threshold range, the system is made to work in "open circuit" by opening inlet valve 60 and adjusting control valves 32 and supply valves 44.

Figure 5:
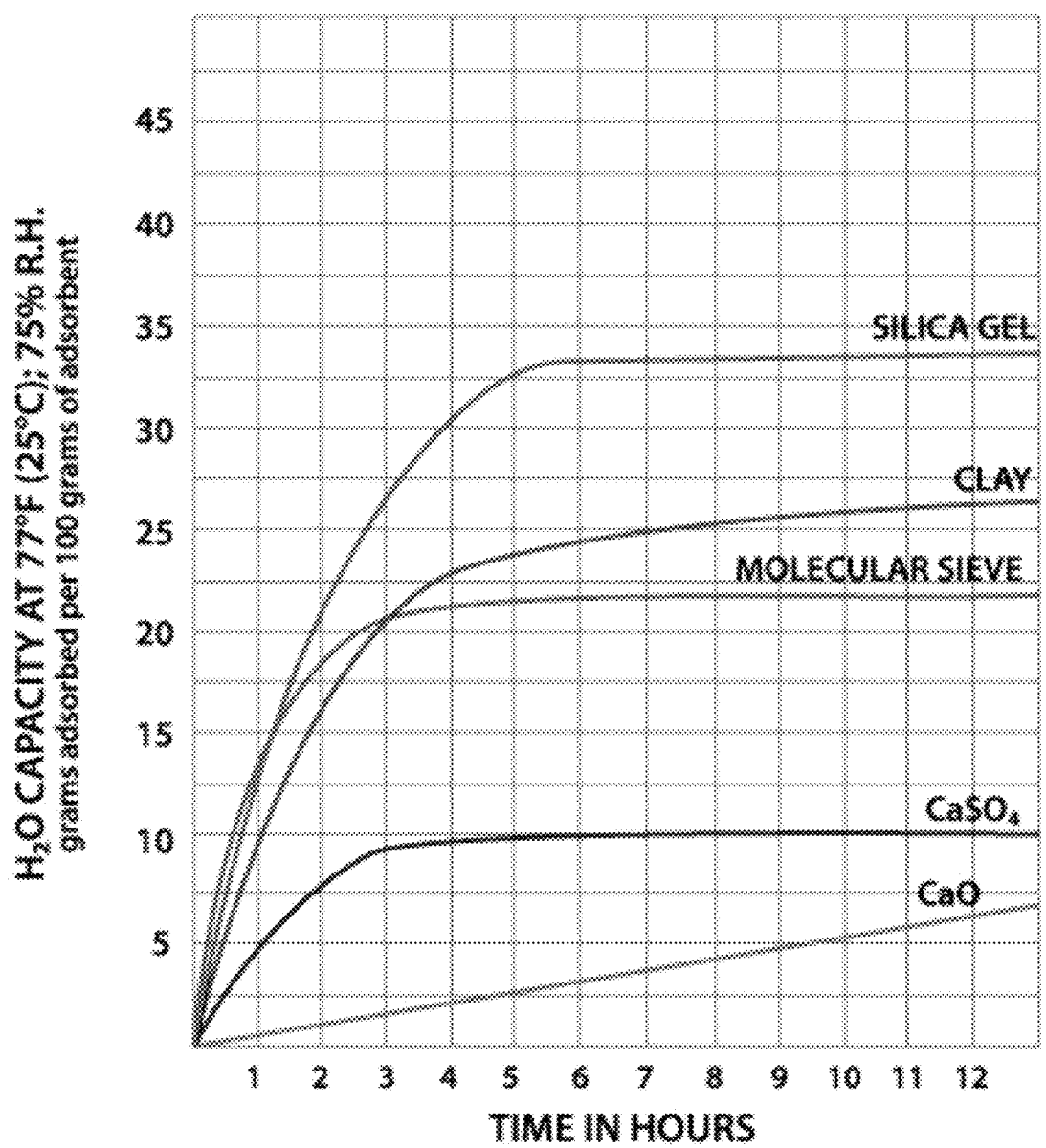
FIG. 5 shows the adsorption rate of some adsorbent materials as a function of time and thus the amount of water adsorbed as a function of time.

Again in this case, the two adsorbent beds 16, 20 will work alternately in adsorption and desorption. In order to maximize the flow rate of produced water, the solid matrix of the adsorbing beds 16, 20 is not adsorbed until saturation, but only the time necessary for the complete desorption of the other bed 20, 16, because the adsorption rate decreases as the trapped water increases (see FIG. 5).

When the temperature exceeds the above threshold, or when passengers require cooling of the passenger compartment, the system returns to "closed-circuit" operation by closing the inlet valve 60, closing the bleed valve 72 and moving control valves 32 and the supply valves 44.

To guarantee the operation of the system as a refrigeration machine, it is essential that a given amount of water is present in the circuit. In order to control such a quantity, it is possible to operate the inlet valves 60 and the bleed valve 72 separately to replenish the quantity of water by keeping the inlet valve open and the outlet valve closed, or to reduce the quantity of water by keeping the inlet valve closed and the outlet valve open, the quantity of operator fluid. These requests may be required by the control system of the refrigeration machine if a deterioration in performance is detected.

The possibility to control the amount of operator fluid during operation, without the need for an operator in a workshop, is a further benefit brought by this invention also with regard to the simple operation as a refrigeration machine.

As can be appreciated from the description above, the present invention allows to overcome the drawbacks presented in the prior art.

In particular, the invention allows the production of demineralized water aboard a vehicle in a completely autonomous way, both in high outdoor temperatures and in low outdoor temperatures.

Such water may be used for injection into the combustion chamber of the internal combustion engine in order to reduce pollutant emissions and/or operating temperature, depending on the type of engine.

The invention does not require the addition of special components compared to an adsorption air conditioning system and therefore does not imply a significant cost increase compared to a known adsorption system.

Advantageously, the system according to the present invention is advantageously able to implement the air conditioning of the passenger compartment and the production of demineralized water without the use of a compressor and therefore without taking mechanical energy directly from the internal combustion engine; the production of demineralized water, in particular, is obtained using the thermal power of the combustion engine which is otherwise lost. In this manner, the thermal energy losses from the combustion engine are limited or at least partially recovered and the overall efficiency of the combustion engine is increased.

Furthermore, as seen, an adsorption refrigeration machine allows to remove heat from a low-temperature environment and transfer it to a higher temperature one spending heat instead of mechanical work as in classic compression systems.

This technology, as well as absorption technology, allows to create trigenerative systems, in which, from the waste heat of a car capable of producing mechanical power (i.e. the vehicle traction engine), a heating or refrigerating power is generated. These systems are effective both for stationary applications, where mechanical power is typically used for power generation and heating/cooling heat power is used for air conditioning of rooms, and for mobile applications in which the mechanical power is typically used directly, or indirectly in the case of series hybrid vehicles, for traction while heat power is used to air-condition the passenger compartment.

It is worth noting that, compared to absorption systems, adsorption systems have the advantage of being more compact, of not requiring a circulation pump (with respective energy consumption), of not having the need to contain dangerous water/lithium bromide or water/ammonia liquid solutions and, above all, of not suffering the strong vibrations to which a component mounted on the chassis of a vehicle may be subjected.

The adsorption consists of the accumulation of molecules of a gas or liquid on the surface of a particular solid, establishing chemical-physical interactions (Wan Der Waals bonds or intermolecular chemical bonds).

Such an adsorption system is extremely reliable and easy to manage and maintain.

The demineralized water thus produced can also be used for other uses than injection into the combustion chamber; for example, it can be used to top up the cooling system of the engine itself, the tank of the windscreen and/or headlight washer and so on.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. An adsorption refrigeration system for the production of demineralized water on board a motor vehicle comprising:
   a condenser, suitable to condense a flow of gas or water vapour,
   an evaporator, suitable to generate a gas or water vapour flow,
   a first and a second adsorbent bed, each containing adsorbent material,
   wherein each adsorbent bed is selectively connectable to the condenser and/or the evaporator by pipes provided with at least one control valve,
   wherein each adsorbent bed is selectively and alternately connectable to a supply circuit of a heating source and to a supply circuit of a cooling source via supply valves,
   wherein the condenser is directly and selectively connectable to the evaporator by a direct branch provided with a relative throttle valve,
   wherein
   said system comprises an inlet valve arranged along an air inlet branch, suitable for selectively making a fluid connection between the air of the environment outside the system and said adsorbent beds, so as to capture water from the external air through an adsorption phenomenon performed by said adsorbent beds and to produce water as a result of the adsorption phenomenon.

2. The adsorption refrigeration system for the production of demineralized water on board a motor vehicle as set forth in claim 1, wherein said system comprises a bleed valve, arranged downstream of the condenser so as to allow condensed water to be bled from said condenser.

3. The adsorption refrigeration system for the production of demineralized water on board a motor vehicle as set forth in claim 2, wherein said bleed valve is arranged along said direct branch, suitable to allow the bleeding of condensed water coming from the condenser towards the evaporator.

4. The adsorption refrigeration system for the production of demineralized water on board a motor vehicle as set forth in claim 3, wherein said bleed valve is a three-way valve, which selectively allows the direct passage of liquid along the direct branch and the bleeding of liquid outside the system.

5. The adsorption refrigeration system for the production of demineralized water on board a motor vehicle as set forth in claim 2, wherein said bleed valve is connected to a water collection tank.

6. The adsorption refrigeration system for the production of demineralized water on board a motor vehicle as set forth in claim 1, wherein at least one of said control valves is a one-way valve automatically driven by the pressure and/or depression created by the flows of gas or water vapour from the adsorbent beds.

7. The adsorption refrigeration system for the production of demineralized water on board a motor vehicle as set forth in claim 1, wherein at least one of said control valves is a valve selectively actuated to ensure the passage/inhibition of relative water vapour or gas flows.

8. The adsorption refrigeration system for the production of demineralized water on board a motor vehicle as set forth in claim 1, wherein said inlet valve is a three-way valve able to selectively allow the passage of gas or water vapour from the evaporator towards the adsorbent beds and the passage of external air towards the adsorbent beds.

9. The adsorption refrigeration system for the production of demineralized water on board a motor vehicle as set forth in claim 1, wherein said air inlet branch is equipped with a filter.

10. The adsorption refrigeration system for the production of demineralized water on board a motor vehicle as set forth in claim 1, wherein said adsorbent material of the adsorbent beds comprises silica-gels and/or zeolites.

11. The adsorption refrigeration system for the production of demineralized water on board a motor vehicle as set forth in claim 1, comprising a control unit wherein the control unit is programmed to obtain the production of demineralized water by condensing the air on the evaporator and/or by adsorbing the humidity of the external air based on the following conditions:
   the possible request for cooling by passengers on board the vehicle,
   outdoor air temperature and/or humidity.

12. The adsorption refrigeration system for the production of demineralized water on board a motor vehicle as set forth in claim 11, wherein said control unit is programmed to force the operation of the refrigeration system, favouring the production of condensation water in the evaporator, if passengers require cooling of the passenger compartment.

13. The adsorption refrigeration system for the production of demineralized water on board a motor vehicle as set forth in claim 11, wherein said control unit is programmed so that, in the absence of a request for cooling of the passenger compartment, the production method of liquid water is chosen between the condensation and adsorption methods according to which ensures a greater flow.

14. The adsorption refrigeration system for the production of demineralized water on board a motor vehicle as set forth in claim 11, wherein the control unit is programmed to obtain the production of demineralized water by condensing the air on the evaporator and/or by adsorbing the humidity of the external air depending on whether the external temperature is above or below a threshold value, respectively.

15. The adsorption refrigeration system for the production of demineralized water on board a motor vehicle as set forth in claim 14, wherein said threshold temperature value is between 7° C. and 17° C.

16. The adsorption refrigeration system for the production of demineralized water on board a motor vehicle as set forth in claim 14, wherein the control unit is programmed so that if the external temperature is lower than this threshold value, the two adsorbent beds are made to work alternately in adsorption and desorption, so that a solid matrix of one adsorbent bed is not allowed to adsorb until saturation, but only the time necessary for the complete desorption of the other adsorbent bed.

17. The adsorption refrigeration system for the production of demineralized water on board a motor vehicle as set forth in claim 14, wherein the control unit is programmed so that if the external temperature is higher than said threshold value, and/or when passengers require the cooling of the passenger compartment, the system operates in a "closed circuit" by producing condensation water on the evaporator.

18. A vehicle comprising an adsorption system for the production of demineralized water as set forth in claim 1.

19. A method of producing demineralized water on board a motor vehicle comprising the steps of:
  providing an adsorption system as set forth in claim 1,
  obtaining the production of demineralized water by condensing the air on the evaporator and/or by adsorbing the humidity of the external air based on the following conditions:
    the possible request for cooling by passengers on board the vehicle,
    outdoor air temperature and/or humidity.

20. The method of producing demineralized water on board a motor vehicle as set forth in claim 19, wherein the operation of the refrigeration system is forced, favouring the production of condensation water in the evaporator, if passengers require cooling of the passenger compartment.

21. The method of producing demineralized water on board a motor vehicle as set forth in claim 19, wherein in the absence of a request for cooling of the passenger compartment, the production method of liquid water is chosen between the condensation and adsorption methods according to which ensures a greater flow.

22. The method of producing demineralized water on board a motor vehicle as set forth in claim 19, wherein the production of demineralized water is obtained by condensing the air on the evaporator and/or by adsorbing the humidity of the external air depending on whether the external temperature is above or below a threshold value, respectively.

23. The method of producing demineralized water on board a motor vehicle as set forth in claim 22, wherein said threshold temperature value is between 7° C. and 17° C.

24. The method of producing demineralized water on board a motor vehicle as set forth in claim 22, wherein if the external temperature is lower than this threshold value, the two adsorbent beds are made to work alternately in adsorption and desorption, so that a solid matrix of one adsorbent bed is not allowed to adsorb until saturation, but only the time necessary for the complete desorption of the other adsorbent bed.

25. The method of producing demineralized water on board a motor vehicle as set forth in claim 22, wherein if the external temperature is higher than said threshold value, and/or when passengers require the cooling of the passenger compartment, the system operates in a "closed circuit" by producing condensation water on the evaporator.

* * * * *